(12) United States Patent
Zeng et al.

(10) Patent No.: US 11,129,048 B2
(45) Date of Patent: *Sep. 21, 2021

(54) DATA TRANSMISSION METHOD, BASE STATION, AND WIRELESS COMMUNICATIONS DEVICE

(71) Applicant: HUAWEI TECHNOLOGIES CO., LTD., Guangdong (CN)

(72) Inventors: Qinghai Zeng, Shanghai (CN); Jian Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 77 days.

This patent is subject to a terminal disclaimer.

(21) Appl. No.: 16/416,747

(22) Filed: May 20, 2019

(65) Prior Publication Data

US 2019/0274067 A1    Sep. 5, 2019

Related U.S. Application Data

(63) Continuation of application No. 14/922,940, filed on Oct. 26, 2015, now Pat. No. 10,341,900, which is a
(Continued)

(51) Int. Cl.
*H04W 4/00* (2018.01)
*H04W 28/08* (2009.01)
(Continued)

(52) U.S. Cl.
CPC ............ *H04W 28/08* (2013.01); *H04L 5/001* (2013.01); *H04L 5/0053* (2013.01);
(Continued)

(58) Field of Classification Search
CPC .................................................... H04W 28/08
See application file for complete search history.

(56) References Cited

U.S. PATENT DOCUMENTS

| 6,788,704 B1 | 9/2004 | Lindsay |
| 7,356,099 B2 | 4/2008 | Lee |

(Continued)

FOREIGN PATENT DOCUMENTS

| CN | 1446011 A | 10/2003 |
| CN | 1635726 A | 7/2005 |

(Continued)

OTHER PUBLICATIONS

Office Action issued in Chinese Application No. 201810957441.9 dated Jul. 30, 2020, 15 pages (with English translation).
(Continued)

*Primary Examiner* — Guang W Li
(74) *Attorney, Agent, or Firm* — Fish & Richardson P.C.

(57) ABSTRACT

A present invention discloses a data transmission method, a base station, and a wireless communications device, which can ensure normal communication between a terminal and a base station in a multi-stream aggregation scenario. The method includes: receiving, by a primary base station, offloading information sent by a wireless communications device, where the wireless communications device is a secondary base station or a terminal; and adjusting, by the primary base station according to the offloading information, offloading data that is allocated to a multi-stream aggregation base station. The present invention is applicable to the communications field.

12 Claims, 9 Drawing Sheets

Related U.S. Application Data continuation of application No. PCT/CN2013/074812, filed on Apr. 26, 2013.

(51) Int. Cl.
| | |
|---|---|
| *H04L 5/00* | (2006.01) |
| *H04L 12/807* | (2013.01) |
| *H04W 24/10* | (2009.01) |
| *H04W 76/15* | (2018.01) |
| *H04W 88/08* | (2009.01) |

(52) U.S. Cl.
CPC ............ *H04L 5/0098* (2013.01); *H04L 47/27* (2013.01); *H04W 24/10* (2013.01); *H04W 76/15* (2018.02); *H04W 88/08* (2013.01)

(56) References Cited

U.S. PATENT DOCUMENTS

| | | | |
|---|---|---|---|
| 8,514,814 B2 | 8/2013 | Yi et al. | |
| 8,542,607 B2 | 9/2013 | Lindskog et al. | |
| 8,958,422 B2 | 2/2015 | Celik et al. | |
| 9,608,899 B2 | 3/2017 | Cohen et al. | |
| 9,629,133 B2 | 4/2017 | Rosa et al. | |
| 9,706,469 B2* | 7/2017 | Himayat | H04W 40/02 |
| 2004/0054796 A1 | 3/2004 | Kikuchi et al. | |
| 2005/0047525 A1 | 3/2005 | Lee | |
| 2005/0119006 A1 | 6/2005 | Cave et al. | |
| 2007/0071000 A1 | 3/2007 | Ulupinar | |
| 2008/0225765 A1* | 9/2008 | Marinier | H04B 7/155 370/310 |
| 2009/0034476 A1* | 2/2009 | Wang | H04W 36/0011 370/331 |
| 2009/0046626 A1 | 2/2009 | Shao | |
| 2009/0052397 A1 | 2/2009 | Meylan | |
| 2009/0168723 A1* | 7/2009 | Meylan | H04W 28/14 370/331 |
| 2011/0026475 A1 | 2/2011 | Lee et al. | |
| 2011/0212693 A1 | 9/2011 | Sågfors et al. | |
| 2012/0163315 A1 | 6/2012 | Govindappa et al. | |
| 2012/0294281 A1 | 11/2012 | Park | |
| 2012/0322486 A1 | 12/2012 | Kameno et al. | |
| 2013/0070682 A1 | 3/2013 | Kim et al. | |
| 2013/0114575 A1 | 5/2013 | Fu et al. | |
| 2013/0132604 A1 | 5/2013 | Cohen et al. | |
| 2013/0176988 A1* | 7/2013 | Wang | H04L 5/0053 370/331 |
| 2013/0242859 A1* | 9/2013 | Celik | H04L 1/1841 370/328 |
| 2013/0324114 A1* | 12/2013 | Raghothaman | H04W 76/14 455/426.1 |
| 2014/0010207 A1 | 1/2014 | Horn et al. | |
| 2014/0050086 A1 | 2/2014 | Himayat et al. | |
| 2014/0056243 A1* | 2/2014 | Pelletier | H04W 72/1268 370/329 |
| 2014/0092865 A1 | 4/2014 | Heo et al. | |
| 2014/0133298 A1 | 5/2014 | Han et al. | |
| 2014/0204771 A1* | 7/2014 | Gao | H04W 36/22 370/252 |
| 2014/0328182 A1 | 11/2014 | Gao et al. | |
| 2015/0350953 A1* | 12/2015 | Himayat | H04W 28/08 370/235 |

FOREIGN PATENT DOCUMENTS

| | | |
|---|---|---|
| CN | 1681252 A | 10/2005 |
| CN | 1691590 A | 11/2005 |
| CN | 1741495 A | 3/2006 |
| CN | 1937469 A | 3/2007 |
| CN | 101511103 A | 8/2009 |
| CN | 102104535 A | 6/2011 |
| CN | 102209030 A | 10/2011 |
| CN | 102783231 A | 11/2012 |
| CN | 102939729 A | 2/2013 |
| CN | 103039109 A | 4/2013 |
| EP | 2582076 A2 | 4/2013 |
| WO | WO 2005104413 A1 | 11/2005 |
| WO | WO2011100492 A1 | 8/2011 |
| WO | WO 2012082046 A1 | 6/2012 |
| WO | 2012139016 A2 | 10/2012 |

OTHER PUBLICATIONS

"Data split options and considerations on L1-plane protocol architecture for dual-connectivity", Nokia Siemens Networks, Nokia Corporation, 3GPP TSG-RAN WG2 Meeting #81bis, Apr. 15-19, 2013, 9 pages, R2-131054.

\* cited by examiner

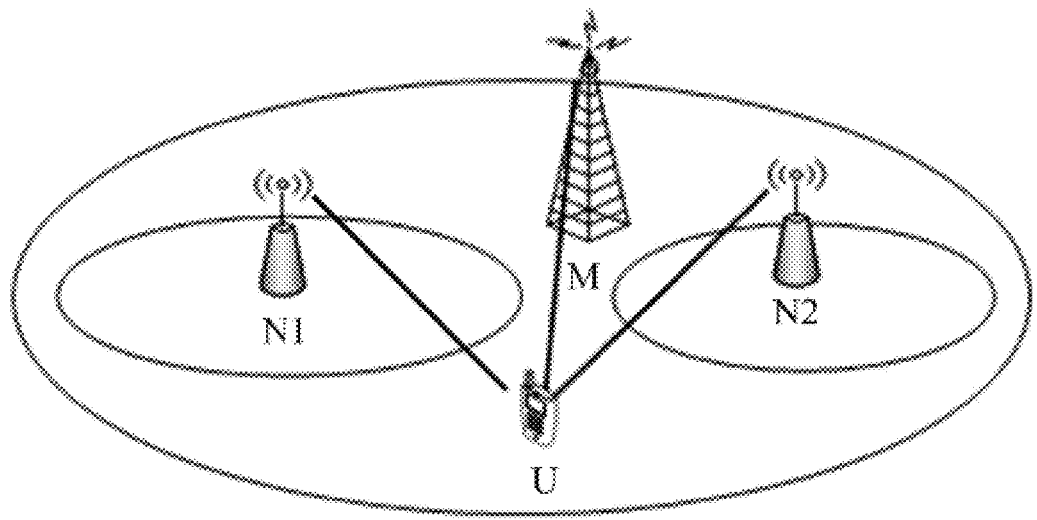

FIG. 1

```
┌─────────────────────────────────────────────────────────┐  ┌─ 201
│ A primary base station receives offloading information sent by │
│   a wireless communications device, where the wireless   │
│ communications device is a secondary base station or a terminal │
└─────────────────────────────────────────────────────────┘
                            │
                            ▼
┌─────────────────────────────────────────────────────────┐  ┌─ 202
│  The primary base station adjusts, according to the offloading │
│ information, offloading data that is allocated to a multiple-stream │
│                aggregation base station                  │
└─────────────────────────────────────────────────────────┘
```

FIG. 2

DATA TRANSMISSION METHOD, BASE STATION, AND WIRELESS COMMUNICATIONS DEVICE

CROSS-REFERENCE TO RELATED APPLICATIONS

This application is a continuation of U.S. patent application Ser. No. 14/922,940, filed on Oct. 26, 2015, which is a continuation of International Application No. PCT/CN2013/074812, filed on Apr. 26, 2013. All of the afore-mentioned patent applications are hereby incorporated by reference in their entireties.

TECHNICAL FIELD

The present invention relates to the communications field, and in particular, to a data transmission method, a base station, and a wireless communications device.

BACKGROUND

In a Long Term Evolution (Long Term Evolution, LTE) system, cross-site carrier aggregation may exist in the future, that is, multiple different sites are configured for one terminal, so as to increase a throughput of the terminal and simplify terminal mobility management.

In a case of cross-site carrier aggregation, a receive end at a Radio Link Control (Radio Link Control, RLC) layer, a Packet Data Convergence Protocol (Packet Data Convergence Protocol, PDCP) layer, or an Internet Protocol (Internet Protocol, IP) layer of an air interface may receive multiple data streams of one radio bearer (Radio Bearer, RB for short). These data streams come from a multi-stream aggregation (Multiple-stream Aggregation, MSA for short) site.

Because load statuses and radio channel conditions of different sites are different, the multiple data streams of one radio bearer may experience different transmission delays, namely, non-uniform transmission delays. For transmission in an unacknowledged mode (Un-acknowledgement Mode, UM), if multi-stream data is aggregated at the RLC layer, the receive end needs to maintain a reordering window (Reordering Window) to perform, according to a sequence number of the RLC layer, reordering on data delivered from a medium access control (Medium Access Control, MAC) layer, so as to implement sequential delivery to the PDCP layer. A size of the reordering window is generally half of a range represented by a sequence number (Sequence Number, SN). For example, if the SN is formed by 10 bits, the size of the reordering window is 512 (that is, half of 2 to the power of 10). How to ensure normal communication between a terminal and a base station in a multi-stream aggregation scenario has become a problem that needs to be resolved urgently in the industry.

SUMMARY

Embodiments of the present invention provide a data transmission method, a base station, and a wireless communications device, which can ensure normal communication between a terminal and a base station in a multi-stream aggregation scenario.

To achieve the foregoing objective, the embodiments of the present invention provide the following technical solutions:

According to a first aspect, a data transmission method is provided, including:

receiving, by a primary base station, offloading information sent by a wireless communications device, where the wireless communications device is a secondary base station or a terminal; and adjusting, by the primary base station according to the offloading information, offloading data that is allocated to a multi-stream aggregation base station; where when the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation.

In a first possible implementation manner, according to the first aspect, the adjusting, by the primary base station according to the offloading information, offloading data that is allocated to a multi-stream aggregation base station specifically includes:

determining, by the primary base station according to the offloading information, that a difference between a sequence number of a first PDU that is waiting to be reordered in a reordering window and an upper boundary of the reordering window is greater than a preset value; and adjusting, by the primary base station, the offloading data that is allocated to the multi-stream aggregation base station, so that the difference between the sequence number of the first PDU that is waiting to be reordered and the upper boundary of the reordering window is not greater than the preset value, where the upper boundary of the reordering window is equal to a value of the largest sequence number of a PDU received by the terminal plus one, and the preset value is a value that is less than or equal to a size of the reordering window.

In a second possible implementation manner, according to the first possible implementation manner, when the wireless communications device is the secondary base station, the offloading information specifically includes a sequence number of a last PDU sent by the secondary base station to the terminal; and the determining, by the primary base station according to the offloading information, that a difference between a sequence number of a first PDU that is waiting to be reordered in a reordering window and an upper boundary of the reordering window is greater than a preset value specifically includes:

determining, by the primary base station according to the offloading information, that a maximum difference between sequence numbers of last PDUs sent separately by the primary base station and by the secondary base station to the terminal is greater than the preset value.

In a third possible implementation manner, according to the second possible implementation manner, before the receiving, by a primary base station, offloading information sent by a wireless communications device, the method further includes:

sending a first request message to the secondary base station, where the first request message is used to request the secondary base station to report the sequence number of the last PDU sent to the terminal; or sending a second request message to the secondary base station, where the second request message carries a report period, and is used to request the secondary base station to report, according to the report period, the sequence number of the last PDU sent to the terminal.

In a fourth possible implementation manner, according to the first possible implementation manner, when the wireless communications device is the terminal, the offloading information specifically includes: information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

In a fifth possible implementation manner, according to the fourth possible implementation manner, receiving, by a primary base station, offloading information sent by a wireless communications device, the method further includes:

sending a third request message to the terminal, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window; or sending a fourth request message to the terminal, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

In a sixth possible implementation manner, with reference to the first aspect or the first possible implementation manner to the fifth possible implementation manner, the offloading information further includes a radio bearer identifier.

According to a second aspect, a data transmission method is provided, including:

sending, by a wireless communications device, offloading information to a primary base station, so that the primary base station adjusts, according to the offloading information, offloading data that is allocated to a multi-stream aggregation base station, where the wireless communications device is a secondary base station or a terminal; and performing data transmission with the terminal according to the offloading data that is allocated to the multi-stream aggregation base station and that is adjusted by the primary base station; where when the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation.

In a first possible implementation manner, according to the second aspect, when the wireless communications device is the secondary base station, the offloading information specifically includes a sequence number of a last PDU sent by the secondary base station to the terminal.

In a second possible implementation manner, according to the first possible implementation manner, before the sending, by a wireless communications device, offloading information to a primary base station, the method further includes:

receiving a first request message sent by the primary base station, where the first request message is used to request the secondary base station to report the sequence number of the last PDU sent to the terminal;

or, receiving a second request message sent by the primary base station, where the second request message carries a report period, and is used to request the secondary base station to report, according to the report period, the sequence number of the last PDU sent to the terminal.

In a third possible implementation manner, according to the second aspect, when the wireless communications device is the terminal, the offloading information specifically includes: information that a difference between a sequence number of a first PDU that is waiting to be reordered in a reordering window of the terminal and an upper boundary of the reordering window is greater than a preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window, where the upper boundary of the reordering window is equal to a value of the largest sequence number of a PDU received by the terminal plus one, and the preset value is a value that is less than or equal to a size of the reordering window; and before the sending, by a wireless communications device, offloading information to a primary base station, the method further includes:

determining, by the terminal according to a received sequence number of a PDU, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

In a fourth possible implementation manner, according to the third possible implementation manner, before sending, by the terminal, the offloading information to the primary base station, the method further includes:

receiving a third request message sent by the primary base station, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window;

or, receiving a fourth request message sent by the primary base station, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

According to a third aspect, a base station is provided, where the base station includes a receiving unit and an adjusting unit, where the receiving unit is configured to receive offloading information sent by a wireless communications device, where the wireless communications device is a secondary base station or a terminal; and the adjusting unit is configured to adjust, according to the offloading information, offloading data that is allocated to a multi-stream aggregation base station; where when the wireless communications device is the secondary base station, the offloading information includes a sequence number of a packet data unit PDU sent by the secondary base station to the terminal, and is used by the base station to adjust the offloading data that is allocated to the multi-stream aggregation base station; or when the wireless communications device is the terminal, the offloading information is used by the base station to adjust the offloading data that is allocated to the multi-stream aggregation base station; and the multi-stream aggregation base station includes the base station and the secondary base station that participate in multi-stream aggregation.

In a first possible implementation manner, according to the third aspect, the adjusting unit is specifically configured to:

determine, according to the offloading information, that a difference between a sequence number of a first PDU that is waiting to be reordered in a reordering window and an upper boundary of the reordering window is greater than a preset value; and adjust the offloading data that is allocated to the multi-stream aggregation base station, so that the difference between the sequence number of the first PDU that is waiting to be reordered and the upper boundary of the reordering window is not greater than the preset value, where the upper boundary of the reordering window is equal to a value of the largest sequence number of a PDU received by the terminal plus one, and the preset value is a value that is less than or equal to a size of the reordering window.

In a second possible implementation manner, according to the first possible implementation manner, when the wireless communications device is the secondary base station, the offloading information specifically includes a sequence number of a last PDU sent by the secondary base station to the terminal; and the adjusting unit is specifically configured to:

determine, according to the offloading information, that a maximum difference between sequence numbers of last PDUs sent separately by the base station and by the secondary base station to the terminal is greater than the preset value; and adjust the offloading data that is allocated to the multi-stream aggregation base station, so that the difference between the sequence number of the first PDU that is waiting to be reordered and the upper boundary of the reordering window is not greater than the preset value, where the upper boundary of the reordering window is equal to a value of the largest sequence number of a PDU received by the terminal plus one, and the preset value is a value that is less than or equal to a size of the reordering window.

In a third possible implementation manner, according to the second possible implementation manner, the base station further includes a sending unit, where the sending unit is configured to send a first request message to the secondary base station, where the first request message is used to request the secondary base station to report the sequence number of the last PDU sent to the terminal; or the sending unit is configured to send a second request message to the secondary base station, where the second request message carries a report period, and is used to request the secondary base station to report, according to the report period, the sequence number of the last PDU sent to the terminal.

In a fourth possible implementation manner, according to the first possible implementation manner, when the wireless communications device is the terminal, the offloading information specifically includes: information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

In a fifth possible implementation manner, according to the fourth possible implementation manner, the base station further includes a sending unit, where the sending unit is configured to send a third request message to the terminal, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window; or send a fourth request message to the terminal, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

In a sixth possible implementation manner, with reference to the third aspect or the first possible implementation manner to the fifth possible implementation manner, the offloading information further includes a radio bearer identifier.

According to a fourth aspect, a wireless communications device is provided, including: a sending unit and a communication unit, where the sending unit is configured to send offloading information to a primary base station, so that the primary base station adjusts, according to the offloading information, offloading data that is allocated to a multi-stream aggregation base station, where the wireless communications device is a secondary base station or a terminal; and the communication unit is configured to perform data transmission with the terminal according to the offloading data that is allocated to the multi-stream aggregation base station and that is adjusted by the primary base station; where when the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation.

In a first possible implementation manner, according to the fourth aspect, when the wireless communications device is the secondary base station, the offloading information specifically includes a sequence number of a last PDU sent by the secondary base station to the terminal.

In a second possible implementation manner, according to the first possible implementation manner, the wireless communications device further includes a receiving unit, where the receiving unit is configured to receive a first request message sent by the primary base station, where the first request message is used to request the secondary base station to report the sequence number of the last PDU sent to the terminal;

or, the receiving unit is configured to receive a second request message sent by the primary base station, where the second request message carries a report period, and is used to request the secondary base station to report, according to the report period, the sequence number of the last PDU sent to the terminal.

In a third possible implementation manner, according to the second aspect, when the wireless communications device is the terminal, the offloading information specifically includes: information that a difference between a sequence number of a first PDU that is waiting to be reordered in a reordering window of the terminal and an upper boundary of the reordering window is greater than a preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window, where the upper boundary of the reordering window is equal to a value of the largest sequence number of a PDU received by the terminal plus one, and the preset value is a value that is less than or equal to a size of the reordering window; and the wireless communications device further includes a determining unit, where the determining unit is configured to determine, according to a received sequence number of a PDU, information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

In a fourth possible implementation manner, according to the third possible implementation manner, the wireless communications device further includes a receiving unit, where the receiving unit is configured to receive a third request message sent by the primary base station, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window;

or, the receiving unit is configured to receive a fourth request message sent by the primary base station, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

The embodiments of the present invention provide a data transmission method, a base station, and a wireless communications device. The method includes: receiving, by a primary base station, offloading information sent by a wireless communications device, where the wireless communications device is a secondary base station or a terminal; and adjusting, by the primary base station according to the offloading information, offloading data that is allocated to a multi-stream aggregation base station, where: when the wireless communications device is the secondary base station, the offloading information includes a sequence number of a packet data unit PDU sent by the secondary base station to the terminal; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation. According to this solution, the primary base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

BRIEF DESCRIPTION OF THE DRAWINGS

FIG. 1 is a schematic diagram of a data transmission scenario according to an embodiment of the present invention;

FIG. 2 is a schematic flowchart of a data transmission method according to an embodiment of the present invention;

DETAILED DESCRIPTION

Figure 3:
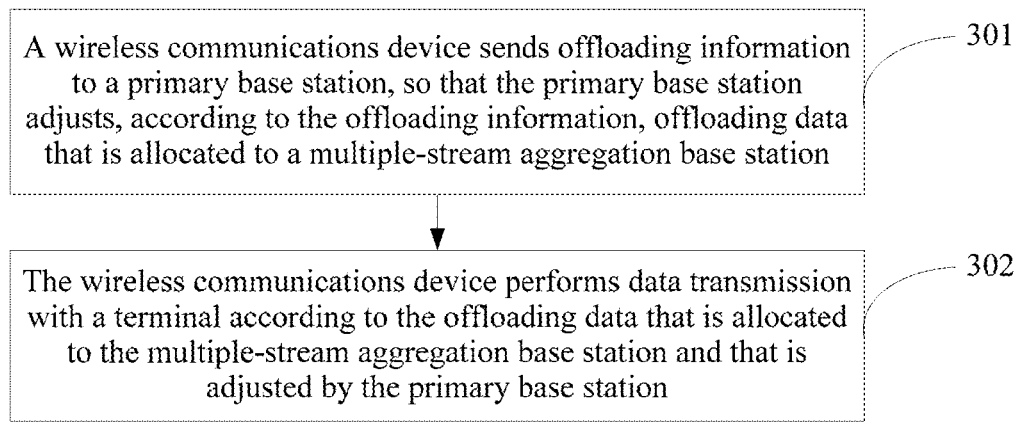
FIG. 3 is a schematic flowchart of another data transmission method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

As shown in FIG. 1, FIG. 1 is a diagram of an application scenario of a data transmission method according to an embodiment of the present invention. A multi-stream aggregation base station includes the primary base station and the secondary base station that participate in multi-stream aggregation. For the scenario diagram shown in FIG. 1, the multi-stream aggregation base station includes a primary base station M, a secondary base station N1, and a secondary base station N2 that participate in the multi-stream aggregation. U is a terminal for which the multi-stream aggregation base station provides a service.

When the multi-stream aggregation base station sends a packet data unit (Protocol Data Unit, PDU) to the terminal, the primary base station first allocates offloading data to each multi-stream aggregation base station, and sends the allocated offloading data to each secondary base station. After receiving the offloading data sent by the primary base station, each secondary base station sends the received offloading data to the terminal, and the primary base station also sends, to the terminal, offloading data that is allocated to the primary base station. In the multi-stream aggregation base station, a multi-stream aggregation base station whose sending speed of the offloading data is the lowest or whose sending speed of the offloading data is less than a first threshold is a low-speed stream base station, and a multi-stream aggregation base station whose sending speed of the offloading data is the highest or whose sending speed of the offloading data is greater than or equal to a first threshold is a high-speed stream base station.

It should be noted that each time the terminal receives a PDU sent by the multi-stream aggregation base station, the terminal needs to determine an upper boundary and a lower boundary of a reordering window according to a value of a sequence number of the PDU.

The upper boundary of the reordering window is defined as a last sequence number of sequence numbers of all PDUs received by the terminal plus one. For example, when a sequence number of a last PDU received by the terminal is 100, an upper boundary of the reordering window is 101. The lower boundary of the reordering window is defined as a difference obtained by subtracting a size of the reordering window from an upper boundary of the reordering window. For example, when a sequence number of a last PDU received by the terminal is 575, the upper boundary of the reordering window is 576, and if a size of the reordering window is 512, the lower boundary of the reordering window is 64.

A sequence number of a first PDU that is waiting to be reordered in the reordering window of the terminal is a sequence number of a first PDU that is not received and that is in the reordering window, where the first PDU that is not received is determined by the terminal according to a received sequence number of a PDU.

An embodiment of the present invention provides a data transmission method, and the method is executed by a primary base station. As shown in FIG. 2, the method includes the following steps:

201. The primary base station receives offloading information sent by a wireless communications device, where the wireless communications device is a secondary base station or a terminal.

After the primary base station allocates offloading data to a multi-stream aggregation base station, and sends the allocated offloading data to each secondary base station, the multi-stream aggregation base station sends, to the terminal, the offloading data that is allocated by the primary base station.

When the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station.

The secondary base station or terminal sends the offloading information to the primary base station under a particular triggering condition.

For the secondary base station, the triggering condition may be that all the offloading data that is allocated by the primary base station to the secondary base station is sent by the secondary base station.

For the terminal, the triggering condition may be information that the terminal determines that a difference between a sequence number of a first PDU that is waiting to be reordered and an upper boundary of a reordering window is greater than the preset value.

When the wireless communications device is the secondary base station, the offloading information includes the sequence number of the packet data unit PDU sent by the secondary base station to the terminal. When the wireless communications device is the terminal, the offloading information is used by the primary base station to adjust the offloading data that is allocated to the multi-stream aggregation base station.

202. The primary base station adjusts, according to the offloading information, offloading data that is allocated to a multi-stream aggregation base station.

In the prior art, because an upper boundary of a reordering window varies according to a sequence number of a PDU received by the terminal, data that is between a lower boundary of a reordering window that is determined according to a previous PDU received by the terminal and a sequence number of a first PDU that is waiting to be reordered in a reordering window that is determined according to a current PDU received by the terminal is to be discarded because the data is considered to appear repeatedly because of an underlying error, thereby causing a loss and out-of-order delivery of a large amount of data.

To resolve problems of a loss and out-of-order delivery of a large amount of data that are caused by non-uniform transmission delays, it should be ensured that a sequence number of a PDU received by the terminal is in a reordering window.

In this embodiment of the present invention, after receiving the offloading information sent by the wireless communications device, the primary base station adjusts, according to the offloading information, the offloading data that is allocated to the multi-stream aggregation base station.

Specifically, the primary base station determines a sending speeding at which the multi-stream aggregation base station sends the offloading data to the terminal; it is determined that a multi-stream aggregation base station whose sending speed of the offloading data is the lowest or whose sending speed of the offloading data is less than a first preset value is a low-speed stream base station; and the primary base station adjusts a third offloading speed of the low-speed stream base station to a fourth offloading speed, where the third offloading speed is an offloading speed at which the primary base station currently allocates the offloading data to the low-speed stream base station, and the fourth offloading speed is less than the third offloading speed.

Therefore, the offloading data sent by the primary base station to the low-speed stream base station is reduced, and the offloading data buffered in the low-speed stream base station is reduced, and then a difference between sequence numbers of PDUs of offloading data multi-stream sent separately by the low-speed stream multi-stream aggregation base station and by the high-speed stream multi-stream aggregation base station to the terminal may become smaller. As a result, an upper boundary of a reordering window is reduced with a change of a received sequence number of a PDU, a difference between a sequence number of a first PDU that is waiting to be reordered and that is received by the terminal and the upper boundary of the reordering window is reduced, and a probability at which the received PDU falls out of the reordering window is reduced, which can reduce problems of a data loss and out-of-order delivery of data that are caused by a transmission delay, thereby ensuring normal communication between the terminal and the base station in a multi-stream aggregation scenario.

Optionally, the primary base station determines a sending speeding at which the multi-stream aggregation base station sends the offloading data to the terminal; it is determined that a multi-stream aggregation base station whose sending speed of the offloading data is the lowest or whose sending speed of the offloading data is less than a first preset value is a low-speed stream base station; it is determined that a multi-stream aggregation base station whose sending speed of the offloading data is the highest or whose sending speed of the offloading data is greater than or equal to the first preset value is a high-speed stream base station; the primary base station sends, to the low-speed stream base station, an indication message that instructs the low-speed stream base station to suspend sending, to the terminal, offloading data that is not sent; and the primary base station allocates, to the high-speed stream base station, the offloading data that is not sent by the low-speed stream base station.

Therefore, the offloading data sent by the primary base station to the low-speed stream base station is reduced, the offloading data buffered in the low-speed stream base station is reduced, and the offloading data that is not sent by the low-speed stream base station is reallocated to the high-speed stream base station, which reduces a problem of a large difference between sequence numbers of PDUs received by the terminal that is caused by a problem of different delays of sending the offloading data by the low-speed stream base station and the high-speed stream base station. As a result, a difference between reordering windows is reduced with a change of a last received sequence number of a PDU, a difference between a sequence number of a first PDU that is waiting to be reordered and that is received by the terminal and a reordering window is reduced, and a probability at which the received PDU falls out of the reordering window is reduced, which can reduce problems of a data loss and out-of-order delivery of data that are caused by a transmission delay, thereby ensuring normal communication between the terminal and the base station in a multi-stream aggregation scenario.

Optionally, the primary base station may adjust a first offloading speed to a second offloading speed, where the first offloading speed is an offloading speed at which the primary base station currently allocates offloading data to the multi-stream aggregation base station, and the second offloading speed is less than the first offloading speed.

Specifically, the primary base station reduces an offloading speed at which the offloading data is allocated to each multi-stream aggregation base station to the second offloading speed. When the primary base station reduces an offloading speed of each multi-stream aggregation base station, for the low-speed stream multi-stream aggregation base station, because offloading data that is allocated by the primary base station is reduced, the low-speed stream multi-stream aggregation base station may send all offloading data that is not sent in a buffer; and for the high-speed stream multi-stream aggregation base station, because the offloading data that is allocated by the primary base station is reduced, the high-speed stream multi-stream aggregation base station has no or a small amount of offloading data to be sent to the terminal. As a result, a difference between reordering windows is reduced with a change of a last received sequence number of a PDU, a difference between a sequence number of a first PDU that is waiting to be reordered and that is received by the terminal and a reordering window, and a probability at which the received PDU falls out of the reordering window is reduced, which can reduce problems of a data loss and out-of-order delivery of data that are caused by a transmission delay, thereby ensuring normal communication between the terminal and the base station in a multi-stream aggregation scenario.

According to the data transmission method provided in this embodiment of the present invention, a primary base station receives offloading information sent by a wireless communications device, where the wireless communications device is a secondary base station or a terminal; and the primary base station adjusts, according to the offloading information, offloading data that is allocated to a multi-stream aggregation base station, where: when the wireless communications device is the secondary base station, the offloading information includes a sequence number of a packet data unit PDU sent by the secondary base station to the terminal; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation. According to this solution, the primary base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

Still another embodiment of the present invention provides a data transmission method, and the method is executed by a wireless communications device. As shown in FIG. 3, the method includes the following steps:

301. The wireless communications device sends offloading information to a primary base station, so that the primary base station adjusts, according to the offloading information, offloading data that is allocated to a multi-stream aggregation base station.

The wireless communications device is a secondary base station or a terminal.

After the primary base station allocates the offloading data to the multi-stream aggregation base station, and sends the allocated offloading data to each secondary base station, the multi-stream aggregation base station sends, to the terminal, the offloading data that is allocated by the primary base station.

When the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station.

The secondary base station sends the offloading information to the primary base station under a particular triggering condition.

The triggering condition may be that all the offloading data that is allocated by the primary base station to the secondary base station is sent by the secondary base station.

The terminal sends the offloading information to the primary base station under a particular triggering condition.

The triggering condition may be that the terminal determines that a difference between a sequence number of a first PDU that is waiting to be reordered and an upper boundary of a reordering window is greater than a preset value.

After receiving the offloading information sent by the secondary base station, the primary base station adjusts, according to the offloading information, the offloading data that is allocated to the multi-stream aggregation base station.

302. The wireless communications device performs data transmission with a terminal according to the offloading data that is allocated to the multi-stream aggregation base station and that is adjusted by the primary base station.

After the primary base station adjusts the offloading data that is allocated to the multi-stream aggregation base station, the wireless communications device performs data transmission with the terminal according to offloading data allocated after the primary base station adjusts the offloading data.

When the wireless communications device is the secondary base station, because the primary base station adjusts, according to the offloading information reported by the secondary base station, the offloading data that is allocated to the multi-stream aggregation base station, according to this solution, there is no need to change a chip of the terminal, and a change on a related protocol is relatively small.

When the wireless communications device is the terminal, a status of a sequence number of a PDU received by the terminal can be accurately determined, and the offloading data that is allocated to the multi-stream aggregation base station can be more accurately adjusted.

According to the data transmission method provided in this embodiment of the present invention, a wireless communications device sends offloading information to a primary base station, so that the primary base station adjusts, according to the offloading information, offloading data that is allocated to a multi-stream aggregation base station; and the wireless communications device performs data transmission with a terminal according to the offloading data that is allocated to the multi-stream aggregation base station and that is adjusted by the primary base station. According to this solution, the primary base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

Figure 4:
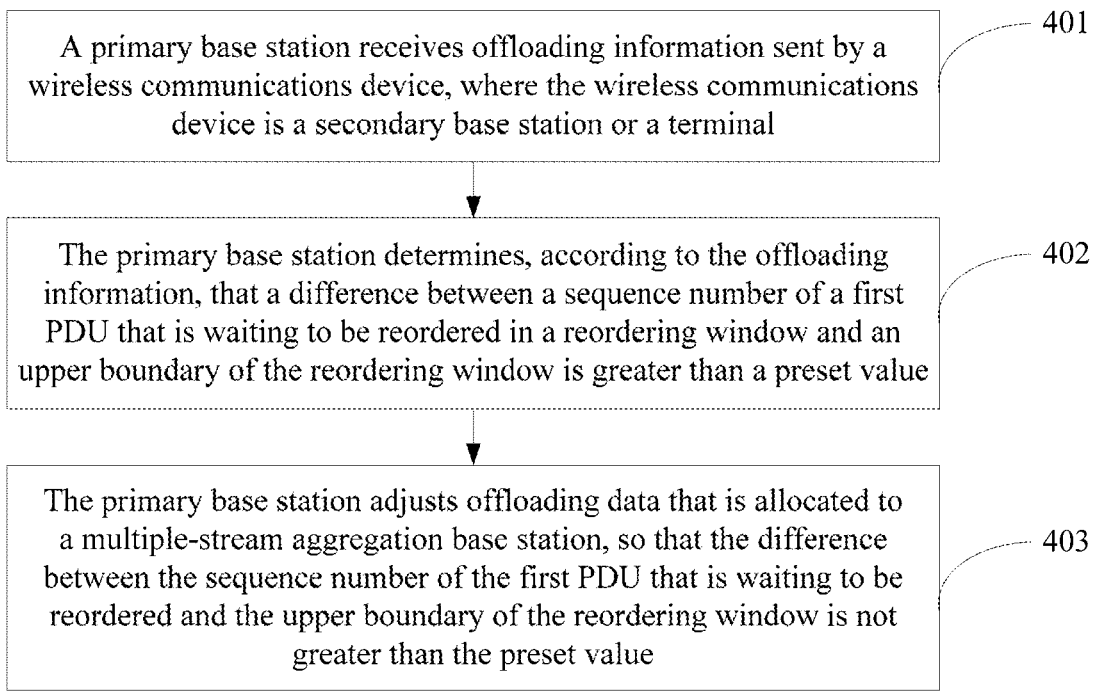
FIG. 4 is a schematic flowchart of still another data transmission method according to an embodiment of the present invention.

Still another embodiment of the present invention provides a data transmission method. As shown in FIG. 4, the method includes the following steps:

401. A primary base station receives offloading information sent by a wireless communications device, where the wireless communications device is a secondary base station or a terminal.

A multi-stream aggregation base station is classified into a primary base station and a secondary base station. After the primary base station allocates offloading data to a multi-stream aggregation base station and sends the allocated offloading data to each secondary base station, the multi-stream aggregation base station sends, to the terminal, the offloading data that is allocated by the primary base station.

When the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station.

The secondary base station or terminal sends the offloading information to the primary base station under a particular triggering condition.

For the secondary base station, the triggering condition may be that all the offloading data that is allocated by the primary base station to the secondary base station is sent by the secondary base station.

For the terminal, the triggering condition may be that the terminal determines that a difference between a sequence number of a first PDU that is waiting to be reordered and an upper boundary of a reordering window is greater than a preset value.

402. The primary base station determines, according to the offloading information, that a difference between a sequence number of a first PDU that is waiting to be reordered in a reordering window and an upper boundary of the reordering window is greater than a preset value.

Currently, an SN (Sequence Number) may be formed by 5 bits or 10 bits. The value of the SN is configured by a radio resource control protocol (Radio Resource Control, RRC) and is used to indicate a sequence number of a corresponding PDU. A different SN size indicates a different size of a corresponding reordering window. For example, when the SN is formed by 10 bits, a size of the reordering window is 512; when the SN is formed by 5 bits, a size of the corresponding reordering window is 16.

In a process of determining, by the primary base station, the difference between the sequence number of the first PDU that is waiting to be reordered in the reordering window and the upper boundary of the reordering window, the terminal simultaneously receives a PDU sent by the multi-stream aggregation base station. Therefore, to enable a sequence number of a PDU received by the terminal to fall within the reordering window, when the preset value is less than or equal to a size of the reordering window and approximate to the size of the reordering window, the primary base station needs to adjust the offloading data that is allocated to the multi-stream aggregation base station.

Therefore, the preset value is a value that is less than or equal to the size of reordering window and approximate to the size of the reordering window.

For example, when a size of the reordering window is 512, the preset value may be a value such as 500, 501, 490, 480, or 470. A smaller preset value indicates that the primary base station adjusts earlier the offloading data that is allocated to the multi-stream aggregation base station, which indicates a smaller probability at which a sequence number of a PDU received by the terminal falls out of the reordering window.

Specifically, when a radio bearer is established, an upper boundary of the reordering window is zero; when a sequence number of a PDU received by the terminal falls out of the reordering window, the terminal considers that the sequence number is new data, and updates the upper boundary of the reordering window to the sequence number of the PDU plus one; or, when a sequence number of a PDU received by the terminal falls within the reordering window, the upper boundary of the reordering window is not updated.

After receiving the offloading information sent by the wireless communications device, the primary base station determines, according to the offloading information, whether the difference between the sequence number of the first PDU that is waiting to be reordered in the reordering window and the upper boundary of the reordering window is greater than the preset value.

When the difference between the sequence number of the first PDU that is waiting to be reordered in the reordering window and the upper boundary of the reordering window is greater than the preset value, the primary base station determines that the difference between the sequence number of the first PDU that is waiting to be reordered in the reordering window and the upper boundary of the reordering window is greater than the preset value, and step 403 is performed.

When the difference between the sequence number of the first PDU that is waiting to be reordered in the reordering window and the upper boundary of the reordering window is not greater than the preset value, the primary base station does not process the offloading data that is allocated to the multi-stream aggregation base station.

403. The primary base station adjusts offloading data that is allocated to a multi-stream aggregation base station, so that the difference between the sequence number of the first PDU that is waiting to be reordered and the upper boundary of the reordering window is not greater than the preset value.

When the primary base station determines that the difference between the sequence number of the first PDU that is waiting to be reordered and the upper boundary of the reordering window is greater than the preset value, the primary base station adjusts the offloading data that is allocated to the multi-stream aggregation base station.

In the prior art, because of different load statuses and radio channel conditions of multi-stream aggregation base stations that participate in multi-stream aggregation, multiple PDUs of one radio bearer may experience different transmission delays, which causes that PDUs received at an RLC layer by a terminal are out of order. Therefore, the terminal needs to maintain a reordering window, so that data at the RLC layer is sequentially delivered to a PDCP layer. The reordering window is re-adjusted according to a value of a last received PDU, and data that is not received and is between an upper boundary of a reordering window and an upper boundary of an adjusted reordering window is discarded. If a received sequence number of a PDU falls out of the reordering window, the terminal considers that the sequence number is new data, an upper boundary of the reordering window is correspondingly updated, and the data is stored in an access buffer to wait for further processing. If the sequence number of the received PDU falls within the reordering window, it is required to further determine whether the PDU of the sequence number is received repeatedly or already exceeds a time of waiting to be reordered. If the PDU belongs to the two types of PDUs, the terminal directly deletes the PDU; otherwise, the PDU is a normally received PDU, and the terminal stores the PDU in the buffer to wait for further processing.

Figure 5:
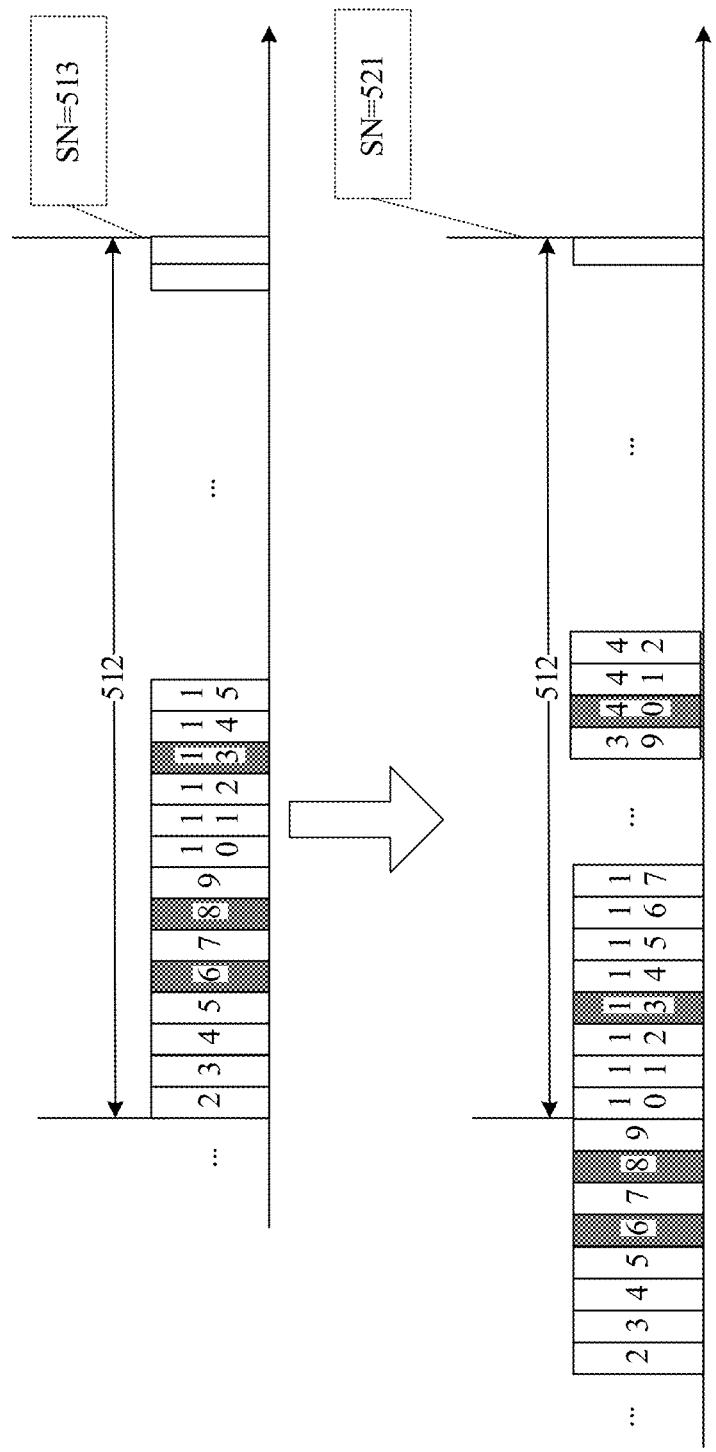
FIG. 5 is a schematic diagram of receiving a PDU by a terminal according to an embodiment of the present invention.

For example, as shown in FIG. 5, gray represents a PDU that is not received, and white represents a received PDU. An example in which a size of a reordering window is 512 is used for description. For example, when a value of an upper boundary of the reordering window that is determined according to a last PDU currently received by the terminal is 514, a lower boundary of the reordering window is 2. Compared with a signal condition, and the like, of a multi-stream aggregation base station that sends PDUs whose sequence numbers are 514 to 520, that of a multi-stream aggregation base station that sends a PDU whose sequence number is 521 is relatively good. Therefore, transmission delays of the PDUs whose sequence numbers are 514 to 520 are relatively large, and a sequence number of a next PDU received by the terminal is 521. When the sequence number of the next PDU received by the terminal is 521, it may be determined that 521 is not in the reordering window and is greater than the upper boundary of the reordering window, and then it is determined that an upper boundary of an adjusted reordering window is 522, and an lower boundary of the adjusted reordering window is 10; the terminal delivers, to the PDCP layer, a received PDU whose sequence number ranges from 2 to 9 and continuously received PDUs whose sequence numbers range from 10 to 521, and a PDU whose sequence number ranges from 2 to 9 and that is not received is considered to encounter a data loss. For example, PDUs whose sequence numbers are 6, 8, 13, and 40 are not received, and then the terminal delivers PDUs whose sequence numbers are 2, 3, 4, 5, 7, 9, 10, 11, and 12 to the PDCP layer, where PDUs whose sequence numbers are 6 and 8 are considered to encounter a data loss, and a PDU whose sequence number is 13 is a first PDU that is waiting to be reordered.

In this embodiment of the present invention, a primary base station may determine a value of a sequence number of a first PDU that is not received by a terminal and a value of an upper boundary of a reordering window. When the value of the upper boundary of the reordering window of the terminal is 514, a value of a lower boundary is 2, PDUs whose sequence number are 2, 3, 4, 5, 7, and 9 are received, and PDUs whose sequence number are 6 and 8 are not received because of a transmission delay, and then a sequence number of a first PDU that is waiting to be reordered and that is received by the terminal is 6. It is assumed that the preset value is 480. The primary base station may determine that a difference between the sequence number 6 of the first PDU that is waiting to be reordered in the reordering window of the terminal and the upper boundary 514 of the reordering window is 508, and 508 is greater than the preset value 480. Therefore, the primary base station adjusts offloading data that is allocated to a multi-stream aggregation base station, so that a maximum difference between sequence numbers of PDUs that are sent, to the terminal, separately by the primary base station and by each secondary base station that send PDUs to the terminal is not greater than a size of the reordering window. Therefore, a sequence number of a next PDU received by the terminal falls within the reordering window. When a difference between the sequence number of the first PDU that is waiting to be reordered and the upper boundary of the reordering window is less than or equal to the preset value, the primary base station stops adjusting the offloading data that is allocated to the multi-stream aggregation base station, so that the PDUs can be sequentially delivered, thereby ensuring normal communication between the terminal and the base station.

Figure 6:
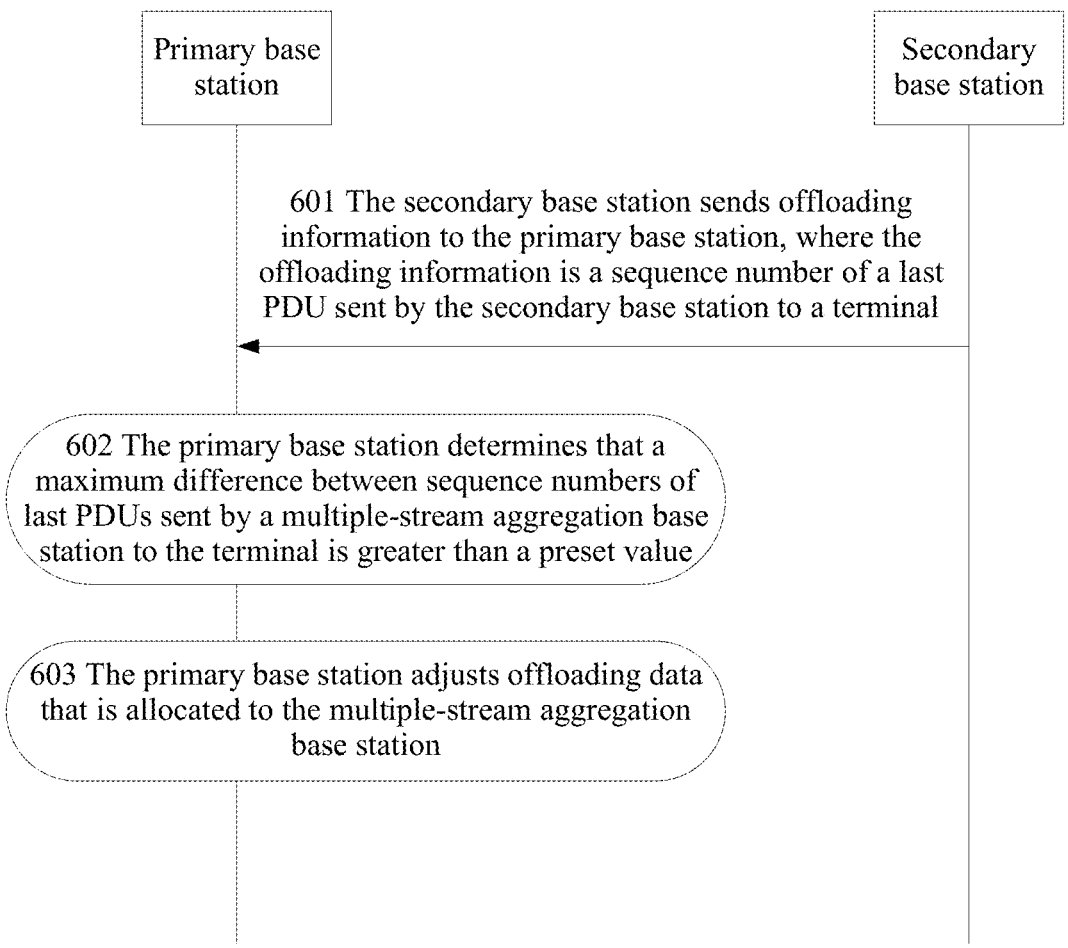
FIG. 6 is a schematic interaction diagram of a data transmission method according to an embodiment of the present invention.

When the wireless communications device is a secondary base station, as shown in FIG. 6, the method includes the following steps:

601. The secondary base station sends offloading information to the primary base station, where the offloading information is a sequence number of a last PDU sent by the secondary base station to a terminal.

After sending all offloading data that is allocated by the primary base station to the secondary base station, the secondary base station may send the offloading information to the primary base station.

602. The primary base station determines that a maximum difference between sequence numbers of last PDUs sent separately by the primary base station and by the secondary base station to the terminal is greater than a preset value.

After receiving the offloading information sent by the secondary base station, the primary base station determines, according to a sequence number of a last PDU sent by the primary base station and a sequence number of a last PDU sent by another secondary base station except the primary base station, whether the maximum difference between the sequence numbers of the last PDUs sent by the multi-stream aggregation base station to the terminal is greater than the preset value.

When the maximum difference between the sequence numbers of the last PDUs sent separately by the primary base station and by the secondary base station to the terminal is greater than the preset value, the primary base station determines that the maximum difference between the sequence numbers of the last PDUs sent separately by the primary base station and by the secondary base station to the terminal is greater than the preset value.

603. The primary base station adjusts offloading data that is allocated to the multi-stream aggregation base station.

When the primary base station determines that the maximum difference between the sequence numbers of the last PDUs sent separately by the primary base station and by the secondary base station to the terminal is greater than or equal to the preset value, the primary base station adjusts the offloading data that is allocated to the multi-stream aggregation base station.

For a method for adjusting, by the primary base station, the offloading data that is allocated to the multi-stream aggregation base station, reference is made to the description of the foregoing embodiments of the present invention, and details are not described again in this embodiment of the present invention.

For a case shown in FIG. 5, a sequence number of a last PDU sent by a secondary base station N1 is 7, a sequence number of a last PDU sent by a secondary base station N2 is 5, a sequence number of a last PDU sent by a primary base station M is 513, and then a maximum difference between sequence numbers of last PDUs sent separately by the primary base station M and by the secondary base station N1 and the secondary base station N2 to the terminal is 513−5=508. 508 is greater than the preset value 480, and therefore the primary base station needs to adjust the offloading data that is allocated to the multiple aggregation base station, so that the terminal can first receive a PDU that is not received before, that is, PDUs whose sequence numbers are 6, 8, 13, and 40. After the terminal receives a PDU whose sequence number is 6, PDUs whose sequence numbers are 2 to 7 may be sequentially delivered; after the terminal receives a PDU whose sequence number is 8, PDUs whose sequence numbers are 2 to 12 may be sequentially delivered; and after the terminal receives a PDU whose sequence number is 13, PDUs whose sequence numbers are 2 to 39 may be sequentially delivered. Therefore, no data loss is caused. Then a sequence number of a first PDU that is waiting to be reordered is updated to 40, and when a size of a reordering window is 514, a difference between the sequence number of the first PDU that is waiting to be reordered and an upper boundary of the reordering window is updated to 474, 474 is less than 480, and therefore the primary base station stops adjusting the offloading data that is allocated to the multi-stream aggregation base station. According to this solution, a problem of a data loss caused by a transmission delay is resolved, and normal communication between the terminal and the base station is ensured.

Optionally, before receiving the offloading information sent by the secondary base station, the primary base station may further send a first request message to the secondary base station.

The first request message is used to request the secondary base station to report a sequence number of a last PDU sent to the terminal.

After receiving the first request message sent by the primary base station, the secondary base station sends, to the primary base station, a sequence number of a last PDU that has been sent.

Optionally, before receiving the offloading information sent by the secondary base station, the primary base station may further send a second request message to the secondary base station.

The second request message carries a report period, and is used to request the secondary base station to report, according to the report period, the sequence number of the last PDU sent to the terminal.

After receiving the second request message sent by the primary base station, the secondary base station may first report, to the primary base station, a sequence number of a last PDU that has been sent, and then enable a timer according to the report period. When the timer expires, the secondary base station reports, to the primary base station, the sequence number of the last PDU that has been sent.

Certainly, after receiving the second request message sent by the primary base station, the secondary base station may also first enable the timer according to the report period. When the timer expires, the secondary base station reports, to the primary base station, the sequence number of the last PDU that has been sent.

Figure 7:
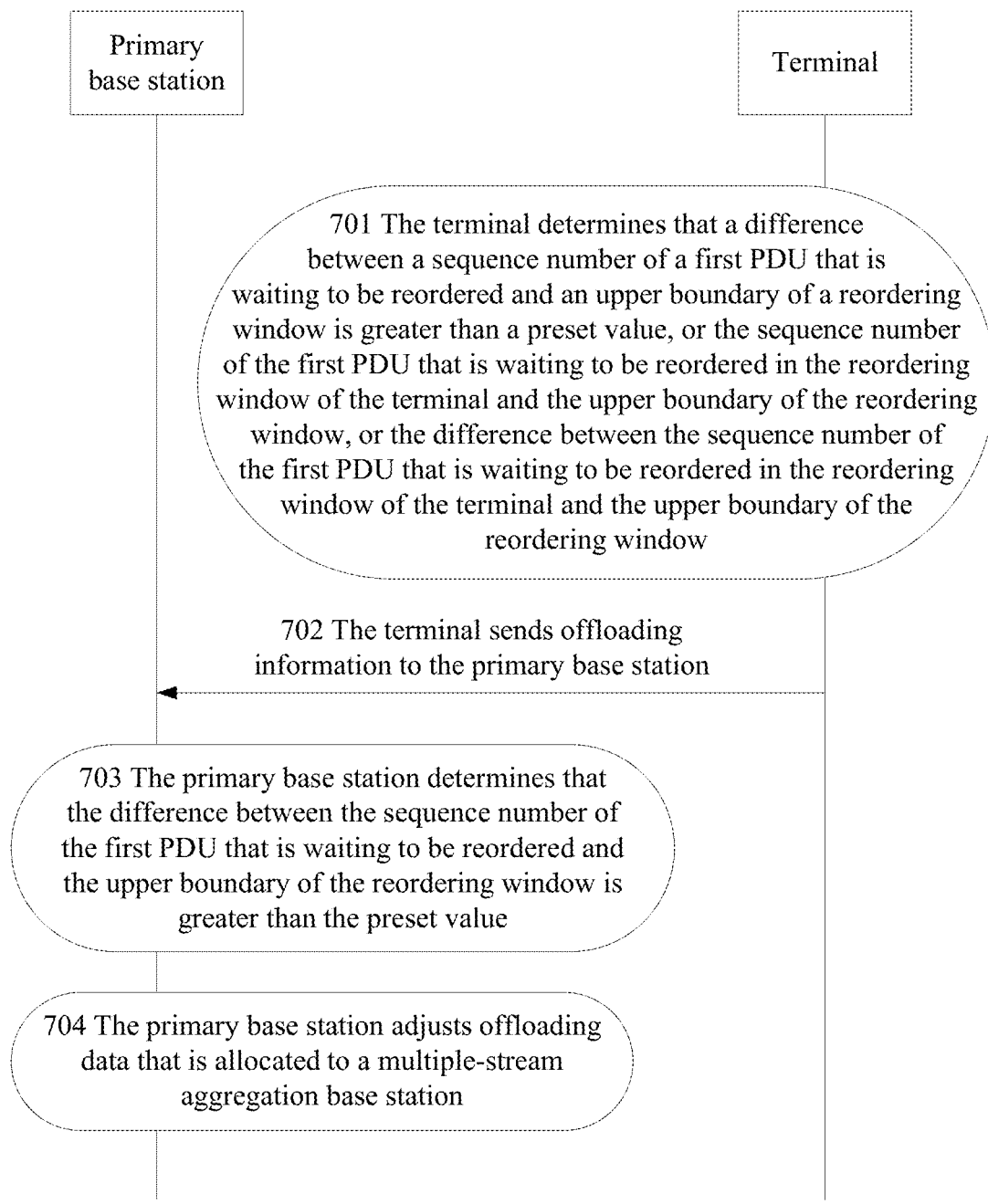
FIG. 7 is a schematic interaction diagram of another data transmission method according to an embodiment of the present invention.

When the wireless communications device is a terminal, as shown in FIG. 7, the method includes the following steps:

701. The terminal determines that a difference between a sequence number of a first PDU that is waiting to be reordered and an upper boundary of a reordering window is greater than a preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

Each time the terminal receives a PDU, the terminal needs to determine an upper boundary and a lower boundary of the reordering window according to a value of a sequence number of the PDU.

Specifically, if a received sequence number of a PDU falls out of the reordering window, the terminal considers that the sequence number is new data, the upper boundary of the reordering window is correspondingly updated, and the data is stored in an access buffer to wait for further processing. If the sequence number of the received PDU falls within the reordering window, it is required to further determine whether the PDU of the sequence number is received repeatedly or already exceeds a time of waiting to be reordered. If the PDU belongs to the two types of PDUs, the terminal directly deletes the PDU; otherwise, the PDU is a normally received PDU, and the terminal stores the PDU in the buffer to wait for further processing.

Then the terminal determines whether the difference between the sequence number of the first PDU that is waiting to be reordered in the reordering window and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

702. The terminal sends offloading information to the primary base station.

The offloading information is information that the difference between the sequence number of the first PDU that is waiting to be reordered and the upper boundary of the reordering window is greater than the preset value. The information may be information that the difference between the sequence number of the first PDU that is waiting to be reordered and the upper boundary of the reordering window is greater than the preset value, or that the difference between the sequence number of the first PDU that is waiting to be reordered and the upper boundary of the reordering window is not greater than the preset value.

Specifically, when the difference between the sequence number of the first PDU that is waiting to be reordered and the upper boundary of the reordering window is greater than the preset value, the terminal sends the offloading information to the primary base station.

Optionally, the offloading information may further be the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

703. The primary base station determines that the difference between the sequence number of the first PDU that is waiting to be reordered and the upper boundary of the reordering window is greater than the preset value.

After receiving the offloading information sent by the terminal, the primary base station determines whether the difference between the sequence number of the first PDU that is waiting to be reordered and the upper boundary of the reordering window is greater than the preset value.

Specifically, when the offloading information is the information that the difference between the sequence number of the first PDU that is waiting to be reordered and the upper boundary of the reordering window is greater than the preset value, the primary base station determines that the difference between the sequence number of the first PDU that is waiting to be reordered and the upper boundary of the reordering window is greater than the preset value.

When the offloading information is the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window, the primary base station determines, according to the offloading information, that the difference between the sequence number of the first PDU that is waiting to be reordered and the upper boundary of the reordering window is greater than the preset value.

704. The primary base station adjusts offloading data that is allocated to a multi-stream aggregation base station.

When the primary base station determines that the difference between the sequence number of the first PDU that is waiting to be reordered and the upper boundary of the reordering window is greater than the preset value, the primary base station adjusts the offloading data that is allocated to the multi-stream aggregation base station.

For a specific method for adjusting, by the primary base station, the offloading data that is allocated to the multi-stream aggregation base station, reference is made to the foregoing embodiments of the present invention, and details are not described again in this embodiment of the present invention.

Optionally, before receiving the offloading information sent by the terminal, the primary base station may further send a third request message to the terminal.

The third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

After receiving the third request message, the terminal sends, to the primary base station, the information that the difference between the sequence number of the first PDU that is waiting to be reordered in the reordering window of the terminal and the upper boundary of the reordering window is greater than the preset value, or the sequence number of the first PDU that is waiting to be reordered and the upper boundary of the reordering window, or the difference between the sequence number of the first PDU that is waiting to be reordered and the upper boundary of the reordering window.

Optionally, before receiving the offloading information sent by the terminal, the primary base station may further send a fourth request message to the terminal.

The fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

After receiving the fourth request message, the terminal may first report, to the primary base station, the sequence number of the first PDU that is waiting to be reordered and the upper boundary of the reordering window, and then enable a timer according to the report period. When the timer expires, the terminal reports, to the primary base station, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

Certainly, after receiving the fourth request message, the terminal may also first enable the timer according to the report period. When the timer expires, the terminal sends, to the primary base station, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

If the offloading data that is allocated by the primary base station to the multi-stream aggregation base station belongs to data of a same service, the offloading data does not need to carry a radio bearer identifier. If the offloading data that is allocated by the primary base station to the multi-stream aggregation base station are multiple types of service data, the offloading data further needs to carry the radio bearer identifier. Then the offloading information sent by the wireless communications device to the primary base station further includes the radio bearer identifier.

In the prior art, because of different load statuses and wireless channel conditions, when a multi-stream aggregation base station sends, to a terminal, offloading data that is allocated by a primary base station, different delays are generated. In addition, because a size of a reordering window in an unacknowledged mode is 16 or 512, and the reordering window is relatively small, a sequence number of a PDU received by the terminal easily falls out of the reordering window because of a delay, which causes problems of a data loss and out-of-order delivery of data. Therefore, increasing a size of the reordering window may reduce problems of a data loss and out-of-order delivery of data that are caused by a transmission delay.

An RLC unacknowledged mode supports segmentation, reassembly, and concatenation, and a data unit that is sent and received is a PDU. A format of the PDU includes two parts: an RLC header structure and data, where the header structure is divided into a fixed part and an extensible part. The fixed part exists in each PDU header, and the extensible part exists only when the extensible part is needed. The fixed part includes an SN part, an FI part, and an E part and is used to indicate PDU information, and the extensible part includes an LI part and an E part and is used to indicate an included SDU or a length of an SDU segment. According to different services carried in an unacknowledged mode, formats of a PDU are different.

Figure 8:
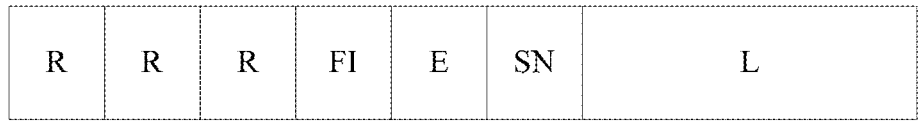
FIG. 8 is a schematic diagram of a format of a PDU according to an embodiment of the present invention.

For a format of the PDU shown in FIG. 8, a header of the PDU has three bits that are not used, that is, three Rs; L represents a data part. Therefore, a part or all of these bits may be used to extend an SN range.

Figure 9:
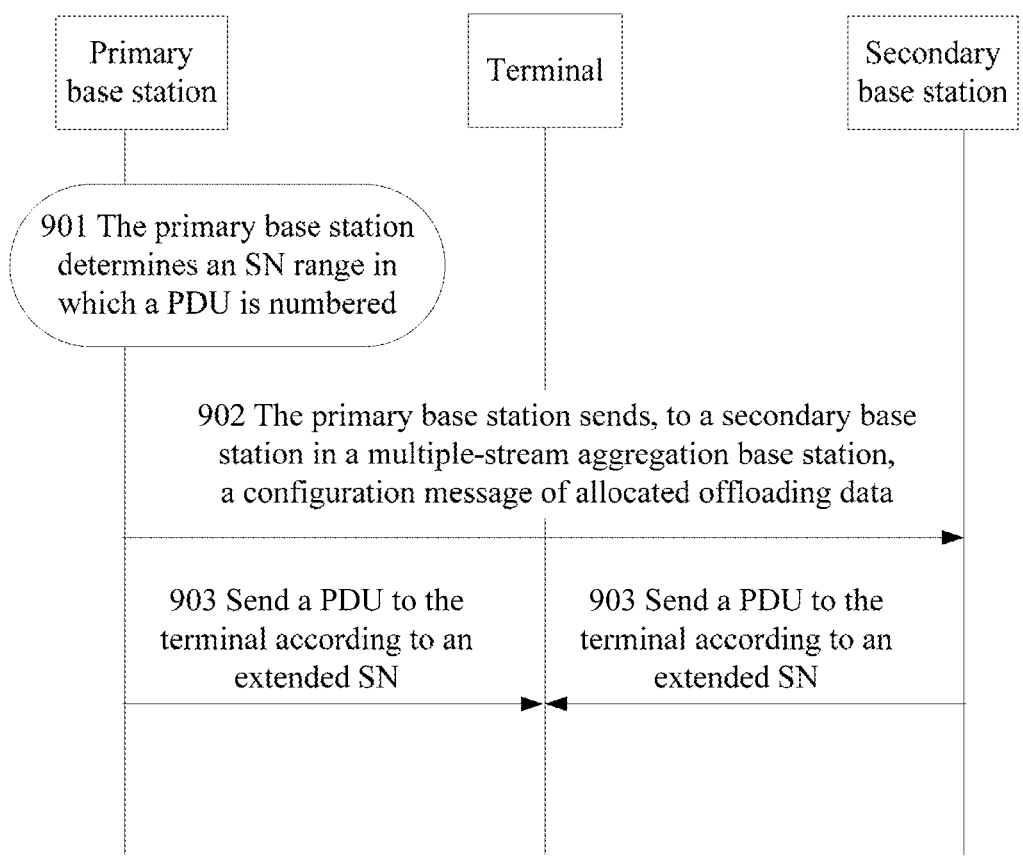
FIG. 9 is a schematic interaction diagram of still another data transmission method according to an embodiment of the present invention.

As shown in FIG. 9, the method includes the following steps:

901. A primary base station determines an SN range in which a PDU is numbered.

When determining to use a bit that is not used to number a PDU, the primary base station determines an extended SN range. The primary base station further determines, according to a determined number of bits that are not used, the SN range in which a PDU is numbered.

The primary base station may use one, two, or three bits that are not used to determine the SN range in which a PDU is numbered.

Specifically, in the prior art, an SN range determined according to a bit of an SN is a first SN range. Therefore, when the primary base station uses one bit that is not used, the SN range is twice the first SN range; when the primary base station uses two bits that are not used, the SN range is four times the first SN range; when the primary base station uses three bits that are not used, the SN range is eight times the first SN range.

For example, in the prior art, an SN is formed by 10 bits. When the primary base station uses one bit that is not used, an SN range is extended from 0-1023 to 0-2047. Because a size of a reordering window is half the value of an SN, the size of the reordering window is extended from 512 to 1024.

902. The primary base station sends, to a terminal and a secondary base station in a multi-stream aggregation base station, a configuration message of allocated offloading data, where the configuration message of the offloading data carries an extended SN range.

The primary base station may send the configuration message of the offloading data to the secondary base station by using RRC signaling.

903. The primary base station and the secondary base station send a PDU to the terminal according to the extended SN.

When the terminal performs PDU reordering by using an extended reordering window, and sequentially delivers the reordered PDUs to a PDCP layer. By using the extended reordering window, when the terminal receives a PDU sent by the multiple-aggregation base station, because a size of the reordering window is extended, delayed data can fall into the reordering window, thereby reducing problems of a data loss and out-of-order delivery of data that are caused by a delay.

The foregoing method is described for an RLC layer, for a PDCP layer or an IP layer, a method for implementing, by using a reordering window, sequential delivery of data to an upper layer may be the same as that of the RLC layer, and details are not described again in this embodiment of the present invention.

According to the data transmission method provided in this embodiment of the present invention, a primary base station receives offloading information sent by a wireless communications device, where the wireless communications device is a secondary base station or a terminal; and the primary base station adjusts, according to the offloading information, offloading data that is allocated to a multi-stream aggregation base station, where: when the wireless communications device is the secondary base station, the offloading information includes a sequence number of a packet data unit PDU sent by the secondary base station to the terminal; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation. According to this solution, the primary base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

Figure 10:
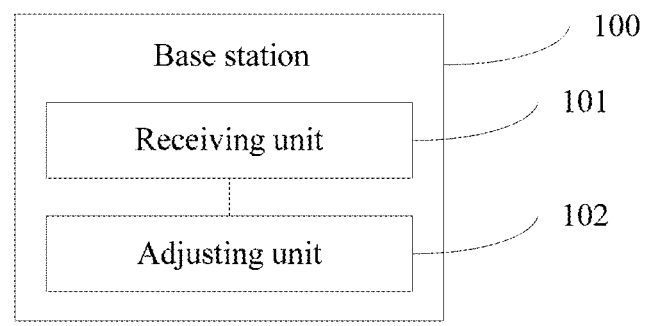
FIG. 10 is a schematic structural diagram of a base station according to an embodiment of the present invention.

Still another embodiment of the present invention provides a base station. As shown in FIG. 10, the base station 100 includes a receiving unit 101 and an adjusting unit 102, where the receiving unit 101 is configured to receive offloading information sent by a wireless communications device, where the wireless communications device is a secondary base station or a terminal; and the adjusting unit 102 is configured to adjust, according to the offloading information, offloading data that is allocated to a multi-stream aggregation base station; where when the wireless communications device is the secondary base station, the offloading information includes a sequence number of a packet data unit PDU sent by the secondary base station to the terminal, and is used by the base station to adjust the offloading data that is allocated to the multi-stream aggregation base station; or when the wireless communications device is the terminal, the offloading information is used by the base station to adjust the offloading data that is allocated to the multi-stream aggregation base station; and the multi-stream aggregation base station includes the base station and the secondary base station that participate in multi-stream aggregation.

Further, the adjusting unit 102 is specifically configured to:

determine, according to the offloading information, that a difference between a sequence number of a first PDU that is waiting to be reordered in a reordering window and an upper boundary of the reordering window is greater than a preset value; and adjust the offloading data that is allocated to the multi-stream aggregation base station, so that the difference between the sequence number of the first PDU that is waiting to be reordered and the upper boundary of the reordering window is not greater than the preset value, where the upper boundary of the reordering window is equal to a value of the largest sequence number of a PDU received by the terminal plus one, and the preset value is a value that is less than or equal to a size of the reordering window.

Optionally, when the wireless communications device is the secondary base station, and the offloading information specifically includes a sequence number of a last PDU sent by the secondary base station to the terminal, the adjusting unit 102 is specifically configured to:

determine, according to the offloading information, that a maximum difference between sequence numbers of last PDUs sent separately by the base station and by the secondary base station to the terminal is greater than the preset value; and adjust the offloading data that is allocated to the multi-stream aggregation base station, so that the difference between the sequence number of the first PDU that is waiting to be reordered and the upper boundary of the reordering window is not greater than the preset value, where the upper boundary of the reordering window is equal to a value of the largest sequence number of a PDU received by the terminal plus one, and the preset value is a value that is less than or equal to a size of the reordering window.

Figure 11:
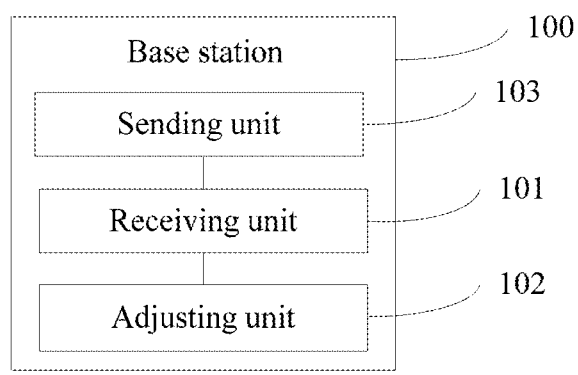
FIG. 11 is a schematic structural diagram of another base station according to an embodiment of the present invention.

Further, as shown in FIG. 11, the base station further includes a sending unit 103, where the sending unit 103 is configured to send a first request message to the secondary base station, where the first request message is used to request the secondary base station to report the sequence number of the last PDU sent to the terminal; or the sending unit 103 is configured to send a second request message to the secondary base station, where the second request message carries a report period, and is used to request the secondary base station to report, according to the report period, the sequence number of the last PDU sent to the terminal.

Optionally, when the wireless communications device is the terminal, the offloading information specifically includes: information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

Further, the base station further includes a sending unit 103, where the sending unit 103 is configured to send a third request message to the terminal, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window; or the sending unit 103 is configured to send a fourth request message to the terminal, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

The adjusting unit 102 is specifically configured to:

adjust a first offloading speed to a second offloading speed, where the first offloading speed is an offloading speed at which the base station currently allocates offloading data to the multi-stream aggregation base station, and the second offloading speed is less than the first offloading speed;

or, determine a sending speed at which the multi-stream aggregation base station sends offloading data to the terminal;

determine a multi-stream aggregation base station whose sending speed of the offloading data is the lowest or whose sending speed of the offloading data is less than a first preset value as a low-speed stream base station; and adjust a third offloading speed of the low-speed stream base station to a fourth offloading speed, where the third offloading speed is an offloading speed at which the base station currently allocates offloading data to the low-speed stream base station, and the fourth offloading speed is less than the third offloading speed;

or, determine a sending speed at which the multi-stream aggregation base station sends offloading data to the terminal;

determine a multi-stream aggregation base station whose sending speed of the offloading data is the lowest or whose sending speed of the offloading data is less than a first preset value as a low-speed stream base station;

determine a multi-stream aggregation base station whose sending speed of the offloading data is the highest or whose sending speed of the offloading data is greater than or equal to the first preset value as a high-speed stream base station;

send, to the low-speed stream base station, an indication message that instructs the low-speed stream base station to suspend sending, to the terminal, offloading data that is not sent; and allocate, to the high-speed stream base station, the offloading data that is not sent by the low-speed stream base station.

Optionally, the offloading information further includes a radio bearer identifier.

According to the base station provided in this embodiment of the present invention, the receiving unit receives offloading information sent by a wireless communications device, where the wireless communications device is a secondary base station or a terminal; and the adjusting unit adjusts, according to the offloading information, offloading data that is allocated to a multi-stream aggregation base station, where: when the wireless communications device is the secondary base station, the offloading information includes a sequence number of a packet data unit PDU sent by the secondary base station to the terminal; or when the wireless communications device is the terminal, the offloading information is used by the base station to adjust the offloading data that is allocated to the multi-stream aggregation base station; and the multi-stream aggregation base station includes the base station and the secondary base station that participate in multi-stream aggregation. According to this solution, the base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

Figure 12:
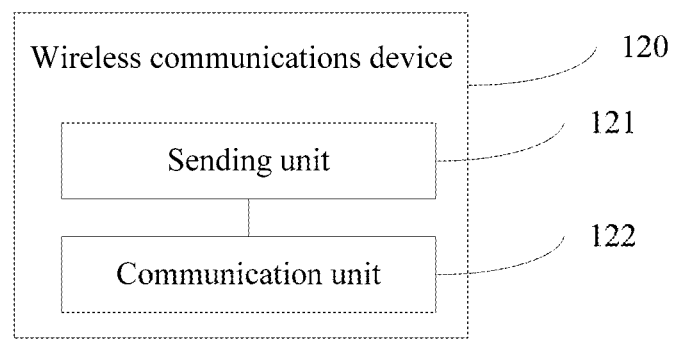
FIG. 12 is a schematic structural diagram of a wireless communications device according to an embodiment of the present invention.

Still another embodiment of the present invention provides a wireless communications device. As shown in FIG. 12, the wireless communications device 120 includes a sending unit 121 and a communication unit 122, where the sending unit 121 is configured to send offloading information to a primary base station, so that the primary base station adjusts, according to the offloading information, offloading data that is allocated to a multi-stream aggregation base station, where the wireless communications device is a secondary base station or a terminal; and the communication unit 122 is configured to perform data transmission with the terminal according to the offloading data that is allocated to the multi-stream aggregation base station and that is adjusted by the primary base station; where when the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation.

Optionally, when the wireless communications device is the secondary base station, the offloading information specifically includes a sequence number of a last PDU sent by the secondary base station to the terminal.

Figure 13:
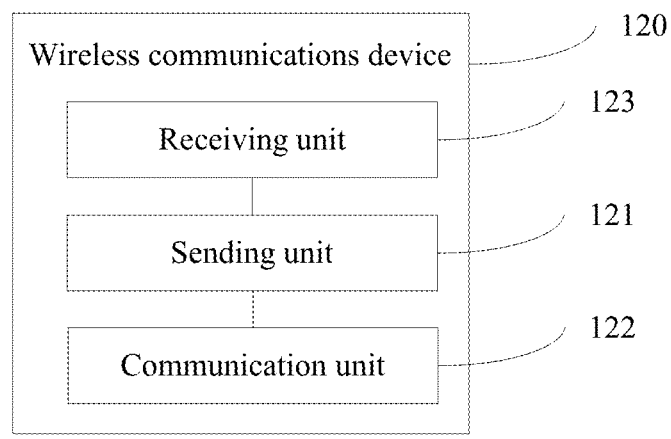
FIG. 13 is a schematic structural diagram of another wireless communications device according to an embodiment of the present invention.

Further, as shown in FIG. 13, the wireless communications device further includes a receiving unit 123, where the receiving unit 123 is configured to receive a first request message sent by the primary base station, where the first request message is used to request the secondary base station to report the sequence number of the last PDU sent to the terminal;

or, the receiving unit 123 is configured to receive a second request message sent by the primary base station, where the second request message carries a report period, and is used to request the secondary base station to report, according to the report period, the sequence number of the last PDU sent to the terminal.

Optionally, when the wireless communications device is the terminal, the offloading information specifically includes: information that a difference between a sequence number of a first PDU that is waiting to be reordered in a reordering window of the terminal and an upper boundary of the reordering window is greater than a preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window, where the upper boundary of the reordering window is equal to a value of the largest sequence number of a PDU received by the terminal plus one, and the preset value is a value that is less than or equal to a size of the reordering window.

Figure 14:
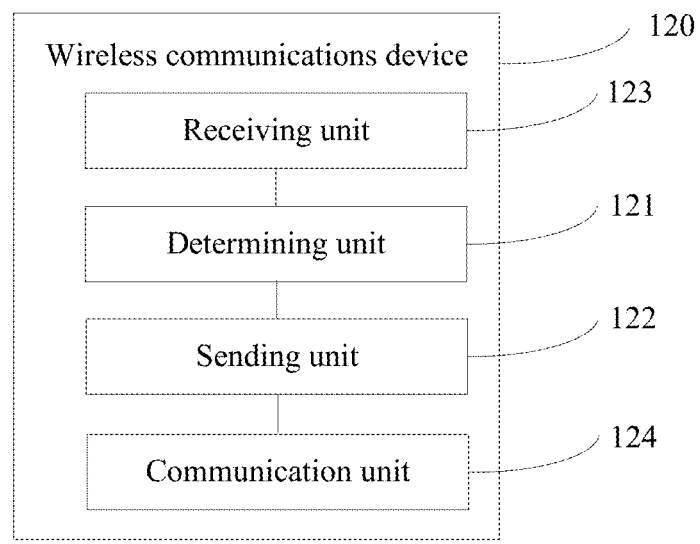
FIG. 14 is a schematic structural diagram of still another wireless communications device according to an embodiment of the present invention.

As shown in FIG. 14, the wireless communications device further includes a determining unit 124, where the determining unit 124 is configured to determine, according to a received sequence number of a PDU, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

Further, the wireless communications device further includes a receiving unit 123, where the receiving unit 123 is configured to receive a third request message sent by the primary base station, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window;

or, the receiving unit 123 is configured to receive a fourth request message sent by the primary base station, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

According to the wireless communications device provided in this embodiment of the present invention, the sending unit sends offloading information to a primary base station, so that the primary base station adjusts, according to the offloading information, offloading data that is allocated to a multi-stream aggregation base station; and the communication unit performs data transmission with a terminal according to the offloading data that is allocated to the multi-stream aggregation base station and that is adjusted by the primary base station; where: when the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station. According to this solution, the primary base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

Figure 15:
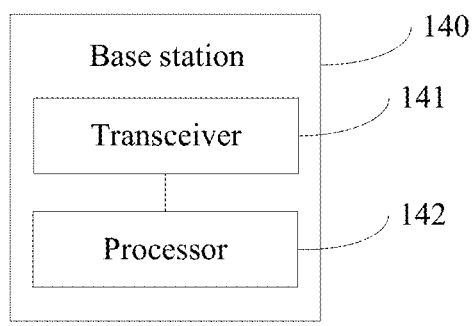
FIG. 15 is a schematic structural diagram of still another base station according to an embodiment of the present invention.

Still another embodiment of the present invention provides a base station. As shown in FIG. 15, the base station 140 includes a transceiver 141 and a processor 142, where the transceiver 141 is configured to receive offloading information sent by a wireless communications device, where the wireless communications device is a secondary base station or a terminal; and the processor 142 is configured to adjust, according to the offloading information, offloading data that is allocated to a multi-stream aggregation base station; where when the wireless communications device is the secondary base station, the offloading information includes a sequence number of a packet data unit PDU sent by the secondary base station to the terminal, and is used by the base station to adjust the offloading data that is allocated to the multi-stream aggregation base station; or when the wireless communications device is the terminal, the offloading information is used by the base station to adjust the offloading data that is allocated to the multi-stream aggregation base station; and The multi-stream aggregation base station includes the base station and the secondary base station that participate in multi-stream aggregation.

Further, the processor 142 is specifically configured to:

determine, according to the offloading information, that a difference between a sequence number of a first PDU that is waiting to be reordered in a reordering window and an upper boundary of the reordering window is greater than a preset value; and adjust the offloading data that is allocated to the multi-stream aggregation base station, so that the difference between the sequence number of the first PDU that is waiting to be reordered and the upper boundary of the reordering window is not greater than the preset value, where the upper boundary of the reordering window is equal to a value of the largest sequence number of a PDU received by the terminal plus one, and the preset value is a value that is less than or equal to a size of the reordering window.

Optionally, when the wireless communications device is the secondary base station, and the offloading information specifically includes a sequence number of a last PDU sent by the secondary base station to the terminal, the processor 142 is specifically configured to:

determine, according to the offloading information, that a maximum difference between sequence numbers of last PDUs sent separately by the base station and by the secondary base station to the terminal is greater than the preset value; and adjust the offloading data that is allocated to the multi-stream aggregation base station, so that the difference between the sequence number of the first PDU that is waiting to be reordered and the upper boundary of the reordering window is not greater than the preset value, where the upper boundary of the reordering window is equal to a value of the largest sequence number of a PDU received by the terminal plus one, and the preset value is a value that is less than or equal to a size of the reordering window.

Further, as shown in FIG. 15, the base station further includes a transceiver 141, where the transceiver 141 is configured to send a first request message to the secondary base station, where the first request message is used to request the secondary base station to report the sequence number of the last PDU sent to the terminal; or the transceiver 141 is configured to send a second request message to the secondary base station, where the second request message carries a report period, and is used to request the secondary base station to report, according to the report period, the sequence number of the last PDU sent to the terminal.

Optionally, when the wireless communications device is the terminal, the offloading information specifically includes: information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

Further, the transceiver 141 is configured to send a third request message to the terminal, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window; or the transceiver 141 is configured to send a fourth request message to the terminal, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

The processor 142 is specifically configured to:

adjust a first offloading speed to a second offloading speed, where the first offloading speed is an offloading speed at which the base station currently allocates offloading data to the multi-stream aggregation base station, and the second offloading speed is less than the first offloading speed;

or, determine a sending speed at which the multi-stream aggregation base station sends offloading data to the terminal;

determine a multi-stream aggregation base station whose sending speed of the offloading data is the lowest or whose sending speed of the offloading data is less than a first preset value as a low-speed stream base station; and adjust a third offloading speed of the low-speed stream base station to a fourth offloading speed, where the third offloading speed is an offloading speed at which the base station currently allocates offloading data to the low-speed stream base station, and the fourth offloading speed is less than the third offloading speed;

or, determine a sending speed at which the multi-stream aggregation base station sends offloading data to the terminal;

determine a multi-stream aggregation base station whose sending speed of the offloading data is the lowest or whose sending speed of the offloading data is less than a first preset value as a low-speed stream base station;

determine a multi-stream aggregation base station whose sending speed of the offloading data is the highest or whose sending speed of the offloading data is greater than or equal to the first preset value as a high-speed stream base station;

send, to the low-speed stream base station, an indication message that instructs the low-speed stream base station to suspend sending, to the terminal, offloading data that is not sent; and allocate, to the high-speed stream base station, the offloading data that is not sent by the low-speed stream base station.

Optionally, the offloading information further includes a radio bearer identifier.

According to the base station provided in this embodiment of the present invention, the transceiver receives offloading information sent by a wireless communications device, where the wireless communications device is a secondary base station or a terminal; and the processor adjusts, according to the offloading information, offloading data that is allocated to a multi-stream aggregation base station, where: when the wireless communications device is the secondary base station, the offloading information includes a sequence number of a packet data unit PDU sent by the secondary base station to the terminal, and is used by the base station to adjust the offloading data that is allocated to the multi-stream aggregation base station; or when the wireless communications device is the terminal, the offloading information is used by the base station to adjust the offloading data that is allocated to the multi-stream aggregation base station. According to this solution, the base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

Figure 16:
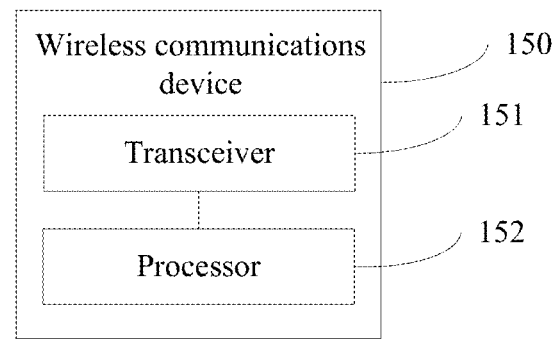
FIG. 16 is a schematic structural diagram of yet another wireless communications device according to an embodiment of the present invention.

Still another embodiment of the present invention provides a wireless communications device. As shown in FIG. 16, the wireless communications device 150 includes a transceiver 151 and a processor 152, where the transceiver 151 is configured to send offloading information to a primary base station, so that the primary base station adjusts, according to the offloading information, offloading data that is allocated to a multi-stream aggregation base station, where the wireless communications device is a secondary base station or a terminal; and the processor 152 is configured to perform data transmission with the terminal according to the offloading data that is allocated to the multi-stream aggregation base station and that is adjusted by the primary base station; where when the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station; and the multi-stream aggregation base station includes the primary base station and the secondary base station that participate in multi-stream aggregation.

Optionally, when the wireless communications device is the secondary base station, the offloading information specifically includes a sequence number of a last PDU sent by the secondary base station to the terminal.

The transceiver 151 is further configured to receive a first request message sent by the primary base station, where the first request message is used to request the secondary base station to report the sequence number of the last PDU sent to the terminal;

or, the transceiver 151 is further configured to receive a second request message sent by the primary base station, where the second request message carries a report period, and is used to request the secondary base station to report, according to the report period, the sequence number of the last PDU sent to the terminal.

Optionally, when the wireless communications device is the terminal, the offloading information specifically includes: information that a difference between a sequence number of a first PDU that is waiting to be reordered in a reordering window of the terminal and an upper boundary of the reordering window is greater than a preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window, where the upper boundary of the reordering window is equal to a value of the largest sequence number of a PDU received by the terminal plus one, and the preset value is a value that is less than or equal to a size of the reordering window.

The processor 152 is further configured to determine, according to a received sequence number of a PDU, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

Further, the transceiver 151 is further configured to receive a third request message sent by the primary base station, where the third request message is used to request the terminal to send the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window;

or, the transceiver 151 is further configured to receive a fourth request message sent by the primary base station, where the fourth request message carries a report period, and is used to request the terminal to report, according to the report period, the information that the difference between the sequence number of the first PDU that is waiting to be reordered in the reordering window of the terminal and the upper boundary of the reordering window is greater than the preset value, or the sequence number of the first PDU that is waiting to be reordered in the reordering window of the terminal and the upper boundary of the reordering window, or the difference between the sequence number of the first PDU that is waiting to be reordered in the reordering window of the terminal and the upper boundary of the reordering window.

According to the wireless communications device provided in this embodiment of the present invention, the transceiver sends offloading information to a primary base station, so that the primary base station adjusts, according to the offloading information, offloading data that is allocated to a multi-stream aggregation base station; and the processor performs data transmission with a terminal according to the offloading data that is allocated to the multi-stream aggregation base station and that is adjusted by the primary base station; where: when the wireless communications device is the secondary base station, the offloading information includes a sequence number of a packet data unit PDU sent by the secondary base station to the terminal, and is used by the primary base station to adjust the offloading data that is allocated to the multi-stream aggregation base station; or when the wireless communications device is the terminal, the offloading information is used by the primary base station to adjust the offloading data that is allocated to the multi-stream aggregation base station. According to this solution, the primary base station may adjust, according to the offloading information sent by the wireless communications device, the offloading data that is allocated to the multi-stream aggregation base station, so that a sequence number of a PDU received by the terminal falls within a reordering window, thereby ensuring normal communication between the terminal and the base station in a multi-stream aggregation scenario.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method in un-acknowledgement mode (UM), comprising:
   receiving, by a primary base station, offloading information from a secondary base station;
   adjusting, by the primary base station according to the offloading information, amount of data that is allocated to the secondary base station;
   wherein the offloading information comprises a sequence number of a last Packet Data Convergence Protocol (PDCP) packet data unit (PDU) from the secondary base station to a terminal, and a value of the sequence number comprises an integer; and
   wherein the adjusting the amount of data comprises:
      determining, by the primary base station according to the offloading information, that a difference between a sequence number of a first PDU that is waiting to be reordered in a reordering window and an upper boundary of the reordering window is greater than a preset value; and
      adjusting, by the primary base station, the amount of data that is allocated to the secondary base station, wherein the difference between the sequence number of the first PDU that is waiting to be reordered and the upper boundary of the reordering window is not greater than the preset value.

2. The method according to claim 1, further comprising:
   requesting the secondary base station to report the sequence number of the last PDCP PDU sent to the terminal.

3. The method according to claim 1, further comprising:
   requesting the secondary base station to report, according to a report period, the sequence number of the last PDCP PDU sent to the terminal.

4. The method according to claim 1, wherein the upper boundary of the reordering window is equal to a value of a largest sequence number of a PDU received by the terminal plus one, and the preset value is a value that is less than or equal to a size of the reordering window.

5. A primary base station, comprising:
   a receiver configured to receive offloading information from a secondary base station;
   a non-transitory memory storage comprising instructions; and
   one or more hardware processors in communication with the non-transitory memory storage, wherein the one or more hardware processors execute the instructions to:
   adjust, according to the offloading information, amount of data that is allocated to the secondary base station in un-acknowledgement mode;
   wherein the offloading information comprises a sequence number of a last Packet Data Convergence Protocol (PDCP) packet data unit (PDU) from the secondary base station to a terminal, and a value of the sequence number comprises an integer; and
   wherein the one or more hardware processors execute the instructions to adjust the amount of data comprises the one or more hardware processors execute the instructions to:
      determine, according to the offloading information, that a difference between a sequence number of a first PDU that is waiting to be reordered in a reordering window and an upper boundary of the reordering window is greater than a preset value; and
      adjust the amount of data that is allocated to the secondary base station, wherein the difference between the sequence number of the first PDU that is waiting to be reordered and the upper boundary of the reordering window is not greater than the preset value.

6. The primary base station according to claim 5, further comprising:
   a transmitter configured to request the secondary base station to report the sequence number of the last PDCP PDU sent to the terminal.

7. The primary base station according to claim 5, further comprising:
   a transmitter configured to request the secondary base station to report, according to a report period, the sequence number of the last PDCP PDU sent to the terminal.

8. The primary base station according to claim 5, wherein the upper boundary of the reordering window is equal to a value of a largest sequence number of a PDU received by the terminal plus one, and the preset value is a value that is less than or equal to a size of the reordering window.

9. A data transmission method in un-acknowledgement mode, comprising:
   sending, by a secondary base station, offloading information to a primary base station;
   performing data transmission with a terminal according to amount of data that is allocated to the secondary base station and that is adjusted by the primary base station, wherein the primary base station adjusts the amount of data by:
      determining, according to the offloading information, that a difference between a sequence number of a first PDU that is waiting to be reordered in a reordering window and an upper boundary of the reordering window is greater than a preset value; and
      adjusting the amount of data that is allocated to the secondary base station, wherein the difference between the sequence number of the first PDU that is waiting to be reordered and the upper boundary of the reordering window is not greater than the preset value; and
   wherein the offloading information comprises a sequence number of a last Packet Data Convergence Protocol (PDCP) packet data unit (PDU) from the secondary base station to the terminal, and a value of the sequence number comprises an integer.

10. The method according to claim 9, further comprises:
    receiving, from the primary base station, a request to report the sequence number of the last PDCP PDU sent to the terminal; or
    receiving, from the primary base station, a request to report, according to a report period, the sequence number of the last PDCP PDU sent to the terminal.

11. A secondary base station, comprising:
    a processor;
    memory coupled to the processor, the memory comprising instructions that, when executed by the processor, cause the secondary base station to:
       send offloading information to a primary base station;
       perform data transmission with a terminal according to amount of data that is allocated to the secondary base station and that is adjusted by the primary base station, wherein the primary base station adjusts the amount of data by:
          determining, according to the offloading information, that a difference between a sequence number of a first PDU that is waiting to be reordered in a reordering window and an upper boundary of the reordering window is greater than a preset value; and adjusting the amount of data that is allocated to the secondary base station, wherein the difference between the sequence number of the first PDU that is waiting to be reordered and the upper boundary of the reordering window is not greater than the preset value; and wherein the offloading information comprises a sequence number of a last packet data unit (PDU) sent by the secondary base station to the terminal, and a value of the sequence number comprises an integer.

12. The secondary base station according to claim 11, further comprising instructions that, when executed by the processor, cause the secondary base station to:

report the sequence number of the last PDU sent to the terminal; or report, according to a report period, the sequence number of the last PDU sent to the terminal.

* * * * *